INVENTOR.
Emanuel Saudinaitis
BY James E. Tracy
Atty.

Jan. 24, 1967 E. SAUDINAITIS 3,300,680

TELEVISION SWEEP SYSTEM WITH SEMICONDUCTOR SWITCH AND ENERGY STORAGE DEVICE FOR EXPEDITING ITS ACTIVATION

Filed Aug. 16, 1963 2 Sheets-Sheet 2

INVENTOR.
Emanuel Saudinaitis
BY James E. Tracy
Atty.

United States Patent Office 3,300,680
Patented Jan. 24, 1967

3,300,680

TELEVISION SWEEP SYSTEM WITH SEMICONDUCTOR SWITCH AND ENERGY STORAGE DEVICE FOR EXPEDITING ITS ACTIVATION

Emanuel Saudinaitis, Glencoe, Ill., assignor to Zenith Radio Corporation, Chicago, Ill., a corporation of Delaware Filed Aug. 16, 1963, Ser. No. 302,518
12 Claims. (Cl. 315—29)

Figure 1:
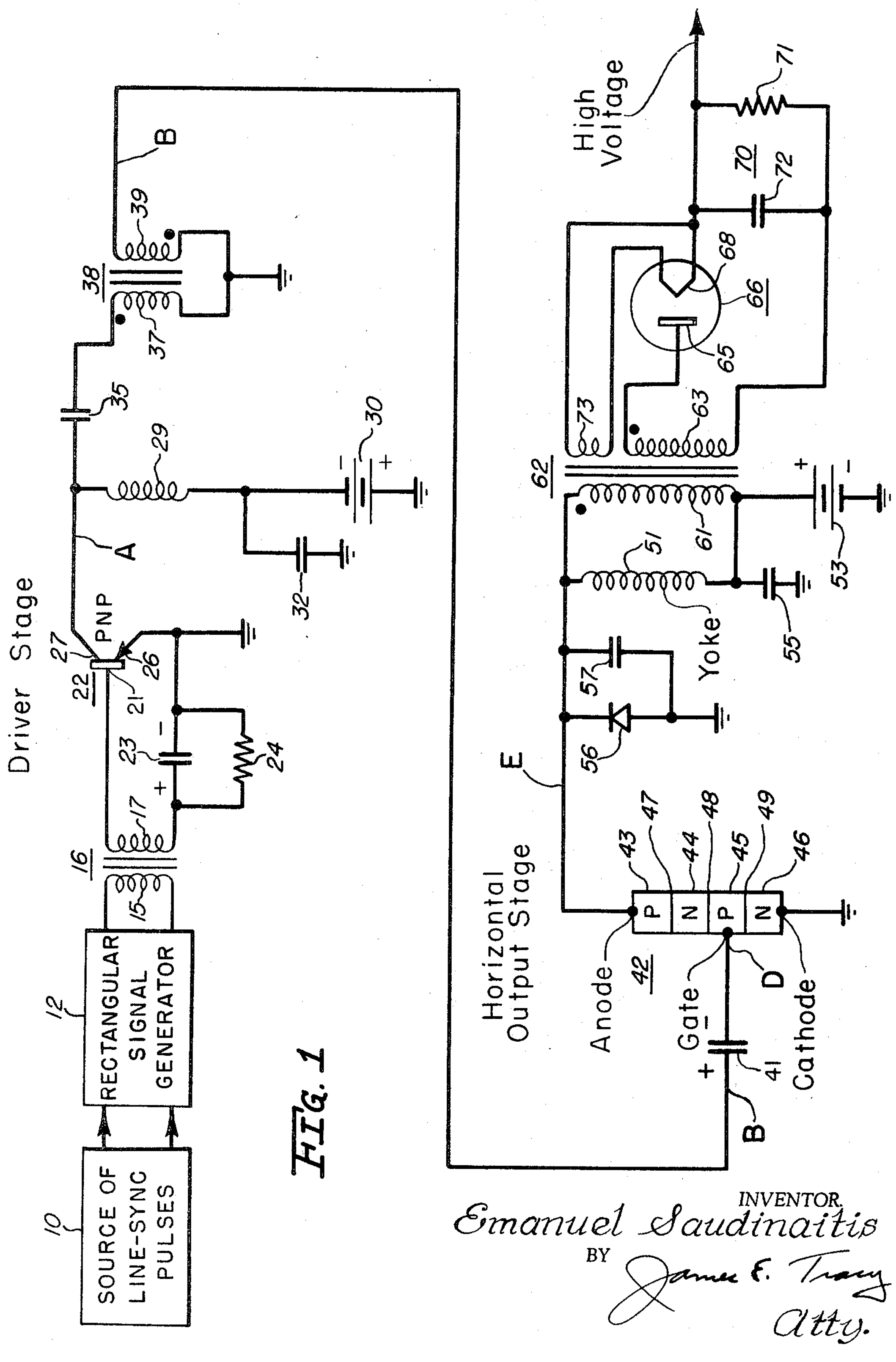

This invention pertains in general to a new and improved semiconductor horizontal scanning system for an image-reproducing device in a television receiver. More particularly, the invention relates to a novel semiconductor horizontal sweep system, requiring relatively little power, in which current flow to an inductive horizontal magnetic deflection yoke of a television picture tube is switched rapidly on and off in a controlled fashion.

As is well recognized, the horizontal sweep system in both vacuum tube type and semiconductor television receivers ordinarily accounts for most of the total power consumed in the receiver. This obtains since the power required to produce saw-tooth current of an amplitude sufficient to deflect the electron beam in a conventional picture tube is substantial compared to the power required to drive all of the remaining stages of the television set. The output stage of most horizontal scanning systems, of both the vacuum tube and semiconductor variety, essentially comprises an electron switch coupled in series with the inductive deflection yoke and a voltage source of fixed magnitude. The switch is alternately actuated between conductive and non-conductive conditions in order to effectively alternately connect and disconnect the voltage source and the yoke. Each on-time interval of the switch embraces approximately the second half of a horizontal trace interval and each off-time interval coincides with approximately the first half of a horizontal trace interval plus a retrace interval. Because of the inductive nature of the yoke, applying a fixed voltage thereto during the switch on-time results in linearly increasing current flow through the yoke. In response to turning off of the switch, the yoke current ceases to increase and a retrace interval is initiated. A damper or recovery diode, usually connected in shunt with the yoke, translates the yoke current during the first half of each line trace interval.

In a vacuum tube type horizontal scanning system, most of the power is consumed in maintaining the switch conductive during the second half of the trace interval. In semiconductor sweep systems developed heretofore, on the other hand, the major or at least a substantial portion of the total sweep power is dissipated in the semiconductor switching device during retrace. To explain, when the switch is turned off to terminate the linear increase in yoke current, the magnetic field, which builds up in the yoke in response to the linearly increasing current during trace, tends to collapse and this results in the development of a relatively high amplitude retrace or flyback voltage pulse which is applied across the switching device.

When the switch takes the form of a semiconductor device, minority carriers are stored therein during each interval in which the device is in its conductive condition. Before the semiconductor device may be completely turned off, the minority carriers must be swept away or "cleaned out." This process requires a finite time interval. In most previously developed semiconductor sweep systems it has not been possible, at least with a commercially practical circuit, to turn the switching device off fast enough so that it is substantially completely non-conductive during the retrace interval in which the high amplitude flyback voltage pulse is applied arross the switch. A substantial power consumption in the semiconductor device therefore results and is proportional to the amplitude of the current flowing through the device multiplied by the magnitude of the retrace voltage pulse.

Attempts have been made by means of various arrangements, some of which require additional semiconductor devices, to speed up or shorten the transistion time from on to off in order to minimize the power dissipated. Unfortunately, the power requirements of these prior systems are still so great that the incorporation of those systems in television receivers is not commercially feasible. Use of those prior sweep systems is especially prohibited in battery operated, completely portable television receivers where power is at a premium.

The semiconductor horizontal scanning system of the present invention constitutes a significant departure from the previous sweep systems comprising semiconductor switching devices in that it achieves turning off of the switching device at such an extremely fast speed that power dissipation during retrace is reduced substantially. Moreover, and of considerable importance, these results are realized by means of a relatively inexpensive circuit, requiring only a single semiconductor switching device which may be of more rugged, and yet less expensive, construction than most other semiconductor switching devices used heretofore in sweep systems. Not only does the semiconductor device as incorporated in the present invention require minimum power, but the driving circuitry for the device dissipates materially less power than most of the previous drivers.

Accordingly, it is an object of the present invention to provide a new and improved horizontal scanning system for an image-reproducing device in a television receiver.

It is another object of the invention to provide a semiconductor horizontal sweep system for producing a saw-tooth current waveform in a magnetic deflection yoke suitable for sweeping the picture tube of a battery operated portable television receiver.

It is a further object of the invention to provide a new and improved semiconductor switching arrangement for controlling the current supply to a load.

A horizontal scanning system for an image-reproducing device in a television receiver, constructed in accordance with one aspect of the present invention, comprises a bistable semiconductor switching device having first, second and control terminals. The device responds to the translation of turn-on current in a predetermined direction between the control and first terminals to establish the device in a first stable operating condition in which current is translated between the first and second terminals, and responds to a predetermined reverse current flow between the control and first terminals to establish the device in a second stable operating condition in which substantially no current is translated between the first and second terminals. An output load including a substantially inductive horizontal deflection yoke is coupled to the first and second terminals of the switching device. A pulse signal source is provided for developing periodically recurring pulses of alternating polarity. There are means for utilizing the pulses of one polarity to translate turn-on current between the control and first terminals in a predetermined direction to establish the switching device in the first operating condition and effect substantially linearly increasing current flow through the load, and for utilizing the pulses of the other polarity to translate turn-off current between the control and first terminals in the reverse direction tending to establish the switching device in the second operating condition. There are also means including an energy storage device, such as a capacitor, coupled to the pulse signal source to be charged in response to the pulses of the one polarity and coupled to the switching device to be discharged in response to the pulses of the other polarity for effecting additional reverse current flow between the control and first terminals to augment the turn-off current and expedite establishment of the switching device in the second operating condition.

In accordance with another aspect of the invention, the bistable semiconductor switching device includes four layers of alternate conductivity type semiconductor material forming three different PN junctions. The horizontal deflection yoke is included in a series circuit which also includes all three of the junctions of the switching device. The pulses of the aforementioned one polarity are employed to translate turn-on current through a predetermined one of the junctions to forward bias that junction and effect current flow through the series circuit. The pulses of the other polarity are used to translate turn-off current through the same junction in the reverse direction tending to reverse bias the junction and effect termination of current flow through the series circuit. The energy storage device, in discharging, effects additional reverse current through the predetermined one junction to expedite the termination of current flow through the series circuit.

Figure 2:
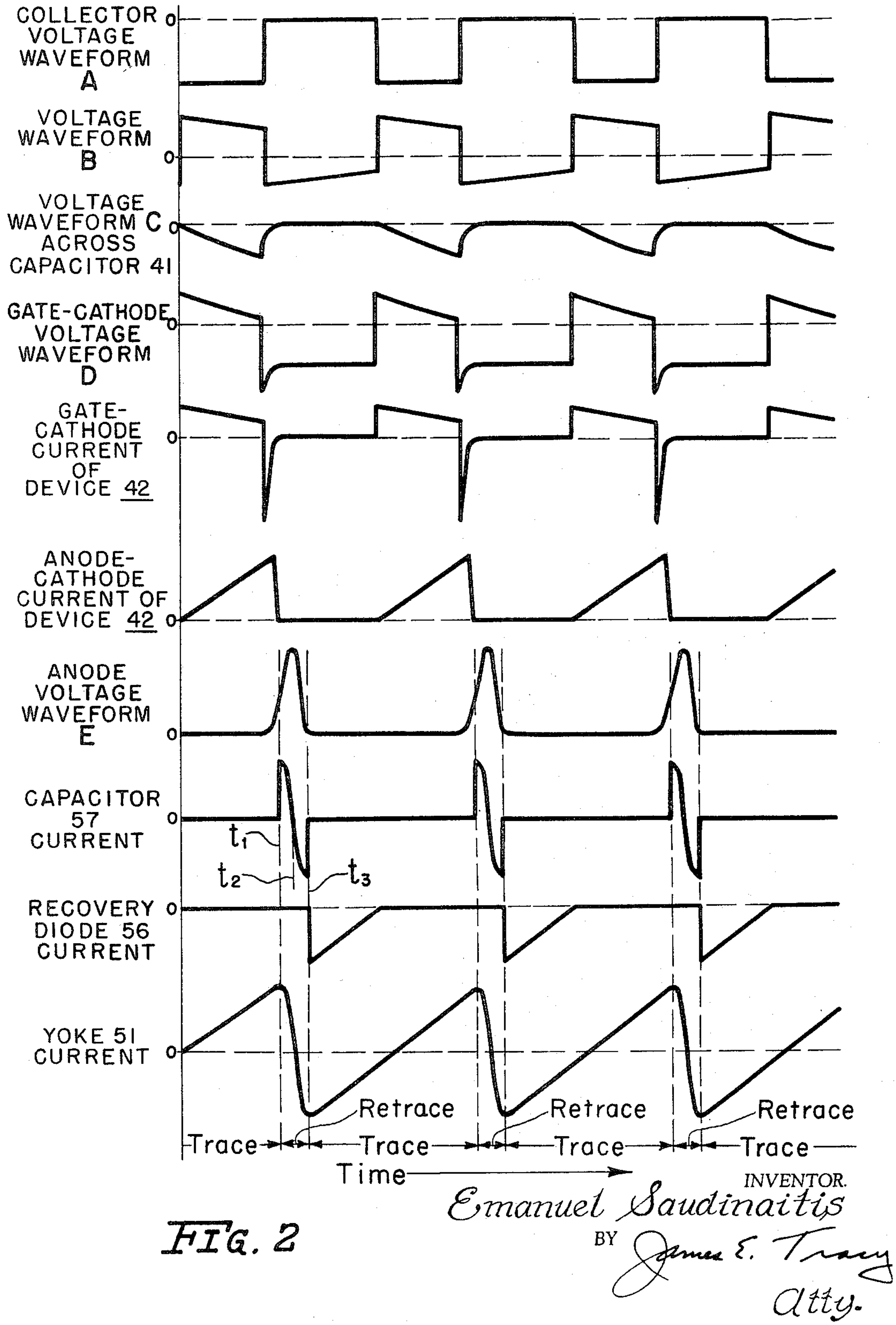

The features of this invention which are believed to be new are set forth with particularity in the appended claims. The invention, together with further objects and advantages thereof, may best be understood, however, by reference to the following description in conjunction with the accompanying drawings, in which:

FIGURE 1 is a schematic diagram of a semiconductor horizontal sweep system, constructed in accordance with the invention, which may be incorporated in a conventional television receiver; and, FIGURE 2 comprises various signal wave forms helpful in explaining the operation of the scanning system of FIGURE 1.

Turning now to a structural description of FIGURE 1, a source 10 of horizontal- or line-synchronizing pulses, such as a synchronizing signal separator or an automatic frequency controlled oscillator of the television receiver, has its output terminals connected to a rectangular signal generator 12 to control the operation thereof. Generator 12 may take a variety of different forms in order to produce at its output terminals a signal of rectangular wave shape having a frequency equal to the horizontal- or line-scanning frequency of the television receiver. For example, generator 12 may comprise a sine wave oscillator which is synchronized by pulses from source 10. The output of the sine wave oscillator may drive a buffer amplifier alternately between saturation and cut-off to convert the sinusoidal signal to one of rectangular wave form.

The output terminals of generator 12 are connected to the primary winding 15 of a transformer 16. The upper terminal of the secondary winding 17 of the transformer is connected to the base 21 of a junction type, PNP transistor 22, and the lower terminal of secondary 17 is coupled to a plane of reference potential, such as ground, through a capacitor 23 which is shunted by a resistor 24. The emitter 26 of transistor 22 is directly connected to ground. Condenser 23 and resistor 24 provide an automatic reverse bias, with the polarity indicated, for the base-emitter junction of transistor 22. The collector 27 of the transistor is coupled through an inductance coil 29 to the negative terminal of a source 30 of unidirectional operating potential such as a battery, the positive terminal of which is grounded. The negative terminal of source 30 is also coupled to ground through an A.C. bypass or decoupling capacitor 32. Collector 27 is also coupled via a D.C. blocking capacitor 35 to one terminal of the primary winding 37 of a transformer 38. The other terminal is connected to ground. Transistor 22 and its associated circuitry consistitutes a driver stage.

One terminal of a secondary winding 39 of transformer 38 is grounded while the other terminal is coupled through an energy storage device, in the form of a capacitor 41, to the control or gate terminal of a bistable semiconductor switching device 42. The device is composed of four layers 43, 44, 45, 46 of alternate conductivity type semiconductor material forming three different PN junctions 47, 48, and 49. Layers or zones 43 and 45 are of P conductivity type while zones 44 and 46 are of N type. The gate or control terminal is connected to P layer 45. In addition to the control terminal, switching device 42 has a first or cathode terminal connected to outer layer 46, and a second or anode terminal connected to the other outer layer 43.

Four-layer device 42 may be a solid state thyratron, a silicon controlled rectifier, a silicon gate controlled switch or the like. In fact, device 42 may comprise any bistable semiconductor switching device having first, second and control terminals and of the type which responds to the translation of turn-on current in a predetermined direction between the control and first terminals to establish the device in a first stable operating condition in which current is translated between the first and second terminals, and which also responds to a predetermined reverse current flow between the control and first terminals to establish the device in a second stable operating condition in which substantially no current is translated between the first and second terminals.

Preferably, device 42 takes the form of a silicon gate controlled switch. If a positive potential is impressed on the gate and is of a magnitude sufficient to forward bias junction 49, turn-on or triggering current flows from the gate or control terminal and through junction 49 to the first or cathode terminal and renders device 42 highly conductive. In this stable operating condition, the anode-cathode current flow is limited only by the external circuit impedance and the supply voltage. By employing the gate terminal to turn-on the four-layer bistable switching device, control of relatively high amplitude anode-cathode current is achieved by a relatively low power driving signal source. Once device 42 has been rendered conductive, it remains in that stable state even subsequent to the termination of the turn-on current. It may thereafter be rendered nonconductive or turned off in response to reversing the current flow between its control terminal and its first or cathode terminal; namely, in response to the translation of turn-off current through junction 49 in the direction from the cathode terminal to the gate terminal.

Device 42 exhibits all of the inherent advantages of a solid state device, including long life, large power handling capability, and ruggedness under severe conditions. Both the turn-on and turn-off times are ordinarily extremely fast, and as will be described, one of the salient features of the present invention resides in making the turn-off time even faster without imposing relatively high driving power requirements on the driving circuitry for the switching device.

The first or cathode terminal of semiconductor switching device 42 is connected to ground and the anode or second terminal is connected through an output load, in the form of a substantially inductive magnetic deflection yoke 51, to the positive terminal of a source of unidirectional operating potential 53, the negative terminal being grounded. With this arrangement, a series circuit is provided which includes source 53, output load 51 and all three junctions 47, 48 and 49 of switching device 42. The positive terminal of source 53 is also coupled to ground via an A.C. bypass or decoupling capacitor 55.

A recovery or damper diode 56, shunted by a capacitor 57, is coupled between the anode of switch 42 and ground. Specifically, the cathode terminal of diode 56 is directly connected to the anode of device 42 while the anode of the damper diode is grounded.

The primary winding 61 of a horizontal output transformer 62 is connected in parallel with yoke 51. Secondary winding 63 of the transformer has one of its terminals connected to the plate or anode 65 of a high voltage rectifier tube 66, and has its other terminal coupled to one side of the filament-cathode 68 of tube 66 by way of a filter 70 which comprises a resistor 71 shunted by a capacitor 72. Filament-cathode 68 is coupled to another winding 73 of horizontal output transformer 62 in order to receive heater power. An output connection is provided at the junction of filament-cathode 68 and filter 70 to provide high voltage for the second anode of a conventional picture tube.

In describing the operation of the scanning generator of FIGURE 1, reference is also made to the idealized signal wave forms of FIGURE 2 which appear at various points in the circuit of FIGURE 1. Signal source 10 produces periodically recurring line-synchronizing pulses for controlling the operation of rectangular signal generator 12 in order that the generator develops at its output terminals a voltage signal of rectangular wave shape and having a frequency equal to the horizontal scanning frequency of the television set. The rectangular shaped voltage signal in turn is applied, by way of transformer 16, resistor 24 and condenser 23, between base 21 and emitter 26 of transistor 22.

The transistor operates as a switch, being alternately rendered conductive and nonconductive. In response to each negative voltage pulse component, appearing at the upper terminal of secondary winding 17 with respect to the lower terminal of that winding, base 21 is established at a negative potential with respect to the emitter potential, and since transistor 22 is of the PNP variety those negative pulse components forward bias the base-emitter junction and turn the transistor on. Emitter-collector current therefore flows through coil 29 to potential source 30. On the other hand, each positive voltage pulse component, appearing at the upper terminal of secondary winding 17 with respect to the lower terminal, causes reverse biasing of the base-emitter junction of transistor 22, resulting in a termination of emitter-collector current flow in the driver stage. Capacitor 23 and resistor 24 are provided to develop, in response to the base-emitter current, a relatively small automatic reverse or back bias in order that base 21 is normally slightly positive with respect to emitter 26. In this way, the negative pulse components of the rectangular shaped signal, developed across secondary 17, must exceed the threshold potential established by bias source 23, 24 before transistor 22 is triggered to its conductive condition.

During the intervals in which transistor 22 is in its off or nonconductive condition, collector 27 is established at a negative potential with respect to ground, whereas during the intervening intervals in which the transistor is triggered to its on or conductive condition, the collector is effectively connected to emitter 26 thereby clamping the collector to ground potential. Hence, the voltage wave form appearing at collector 27 appears as shown by curve A in FIGURE 2. The signal is of rectangular shape having an amplitude which switches from one amplitude level to the other each time the transistor is actuated from one condition to the other. Since collector 27 is essentially clamped to ground potential when the transistor is on, the three pulse components established at zero or ground potential, which is the uppermost amplitude level, designate the on-time intervals of the transistor. Conversely, the three negative voltage pulse components indicate the off-times of the transistor. The relative durations of the positive and negative pulses of wave form A may vary. As shown, the negative components are narrower than the positive components but this is not essential. If desired, the driver stage may be operated such that wave form A constitutes a square wave with positive and negative components of equal time duration.

The rectangular shaped voltage signal of wave form A is applied across the series circuit comprising capacitor 35 and primary winding 37 of transformer 38 in order to produce the voltage of wave form B at the ungrounded terminal of secondary winding 39. Condenser 35 and primary 37 provide a differentiating circuit for shaping the signal of curve A. Shaping of the type provided by a differentiator is desirable primarily to decay each pulse component developed across secondary winding 39 as a precautionary measure to prevent damage to switching device 42.

To explain, when the entire system is initially placed in operation low frequency surge current may develop in the output circuit of transistor 22 which, in the absence of differentiator 35, 37, may result in the application of a voltage pulse of sufficient amplitude to turn device 42 on before a driver pulse of proper shape and amplitude is developed. Otherwise, device 42 may be damaged. This is avoided by reducing or decaying the amplitude of a surge voltage pulse developed across secondary 39. Differentiating circuit 35, 37 has a secondary advantage in that in sharpens the amplitude excursions of the generally rectangular shaped voltage of wave form B. Abruptly changing amplitude variations are desirable in achieving fast actuation of switch 42, as will be described.

Due to the presence of capacitor 35 and the transformer coupling provided by transformer 38, the voltage signal of curve B has no D.C. component as is the case with wave form A, and thus the A.C. axis of wave form B coincides with the zero or ground reference potential. Windings 37 and 39 are so wound polarity-wise with respect to each other that when transistor 22 is off, thereby establishing the ungrounded terminal of primary 37 at a negative potential with respect to ground, the ungrounded terminal of secondary 39 assumes a positive potential level with respect to ground. Conversely, when transistor 22 is turned on, the ungrounded terminals of primary 37 and secondary 39 will be positive and negative respectively with respect to zero potential. Hence, except for the decaying amplitude of the pulse components of wave form B, wave forms A and B are 180° counterparts.

Each positive polarity voltage pulse of wave form B is applied across the series circuit including junction 49 of switching device 42 and energy storage device 41. The charge time constant of condenser 41 is of a value which prevents the capacitor from instantaneously charging up to the potential of the positive voltage pulse. Hence, at the beginning of each positive pulse of curve B, the entire voltage is applied between the control terminal and cathode of switch 42. That potential is of a sufficient magnitude to forward bias junction 49. Turn-on current thus flows from the gate to the cathode and this results in establishing switch 42 in its conductive stable operating condition in which current is translated in the direction from the positive terminal of potential source 53, through yoke 51 and primary winding 61 in parallel, and then through all three junctions of device 42 to ground.

Capacitor 41 charges in response to the turn-on current, and as each positive pulse of curve B continues, the charge builds up and provides an increasing potential across the capacitor with the polarity indicated in FIGURE 1, namely the polarity of this increasing potential is such that the left terminal of capacitor 41 (which is adjacent the ungrounded terminal of secondary 39) charges toward the positive potential of waveform B. As each positive pulse endures, the left terminal of condenser 41 becomes increasingly more positive with respect to the right terminal of that capacitor, and, of course, if the voltage at the right terminal is viewed with respect to that on the left, the voltage at that right terminal becomes increasingly more negative with respect to the left terminal during the continuation of each positive voltage pulse of curve B as shown by wave form C.

The voltage at the gate with respect to the cathode is shown by voltage wave form D. Since the voltage across secondary 39 is in series opposition with the voltage across capacitor 41 during the time interval of each positive voltage pulse of curve B, the gate-cathode voltage during each of those intervals essentially equals the wave form B voltage minus the wave form C voltage. As a consequence, the gate-cathode voltage during the duration of each positive wave form B pulse decreases toward zero, as shown in curve D. Of course, switch 42 remains in its stable conductive state during the intervals of the positive wave form B pulses no matter to what extent the gate-cathode voltage decreases. As is characteristic of four-layer, three junction semiconductor switching devices, once the device is turned on by a gating pulse, it will continue conducting indefinitely even if the gating pulse terminates.

The gate-cathode current of device 42 is also shown in FIGURE 2. During each on-time of the device, the turn-on current flows in the same direction, namely from gate to cathode, and this current decreases during the duration of each on-time inasmuch as the gate-cathode voltage decreases during that interval.

Because of the inductive nature of yoke 51 and primary 61, when switching device 42 is in its conductive state the amplitude of the current flowing from the positive terminal of source 53, through yoke 51 and primary 61, and then from the anode to the cathode increases from zero in substantially linearly fashion. Hence, the wave form of the anode-cathode current flowing through the three junctions of switching device 42 while the device is on, is as shown in FIGURE 2. The current rises in linear fashion from zero, starting at the instant device 42 is rendered conductive by a positive voltage pulse of wave form B. Recovery or damper diode 56 may be ignored while device 42 is turned-on inasmuch as potential source 53 establishes the cathode of diode 56 positive with respect to its anode, thereby rendering the diode cut-off.

Device 42 remains conductive and its anode-cathode current continues to increase linearly until the instant at which wave form B changes from positive to negative polarity. At that instant, the ungrounded terminal of secondary winding 39 assumes a negative potential with respect to ground. The voltage across secondary 39 now has a polarity which is in series aiding relationship with the polarity of the potential developed across capacitor 41. Thus, in response to each negative voltage pulse of wave form B, a negative voltage is applied to the control or gate terminal of switch 42 which has a magnitude equal to the sum of the voltages developed across secondary 39 and capacitor 41. The total negative voltage applied to the gate is seen in wave form D at the beginning of each negative pulse component. The magnitude is sufficient to reverse bias junction 49 and effect the flow of turn-off current in the direction from the cathode to the gate. The turn-off current triggers device 42 to its nonconductive stable operating condition in which substantially no anode-cathode current flows.

A major advantage of including capacitor 41 in series with the coupling circuit from secondary 39 to the control terminal of device 42 permits turning off of the switch with a pulse from the driver of a magnitude significantly less than that which would ordinarily be required in the absence of capacitor 41. This obtains since the driving stage effectively has to provide only a portion of the total turn-off pulse. This advantage consequently places materially smaller driving power requirements on the part of the driving circuitry for the gate of switch 42.

Capacitor 41 not only minimizes the driving power but it shortens the cut-off time of switching device 42. To explain, because of the voltage across capacitor 41 the total negative voltage applied to the gate at the beginning of each negative pulse of wave form B is sufficient to lower the impedance of junction 49 to such an extent that the charge stored on the capacitor is permitted to discharge through that junction, in the direction from the cathode to the gate, substantially instantaneously. In fact, if the peak negative voltage applied to the gate exceeds the Zener breakdown voltage of junction 49, the gate-cathode path is essentially a short circuit and achieves even faster discharge of the capacitor.

By discharging capacitor 41 through junction 49, the minority stored carriers in switch 42, which are produced when the device is established in its conductive state, are swept away much faster than would be the case in the absence of the capacitor. As shown by the gate-cathode current wave form in FIGURE 2, in response to a change in polarity from positive to negative of wave form B, the gate-cathode current reverses direction and attains a relatively high peak amplitude due to the fast discharge of capacitor 41.

In prior art semiconductor sweep circuits, reverse gate-cathode current is likely to flow in response to the negative pulses of wave form B during the entire duration of each of those pulses, and such sustained reverse current may overload device 42 and may possibly damage it. However, in a system embodying the present invention, after capacitor 41 has completed its discharge it presents such a high impedance that reverse gate-cathode current, in response to the negative pulses of curve B, cannot take place. For that reason, subsequent to the initial surge of reverse current in response to a change from positive to negative polarity of wave form B, the gate-cathode current reduces to zero and stays there during the remainder of each time-interval defined by a negative pulse of curve B, as shown by the gate-cathode current wave form in FIGURE 2.

If desired, the turn-off current produced by the negative pulse components of wave form B may be of sufficient magnitude to trigger device 42 to its nonconductive condition. That turn-off current is then augmented by the additional reverse peak current flow caused by discharge of capacitor 41. Adding the capacitor discharge current to the turn-off current expedites establishment of switching device 42 in its nonconductive condition.

On the other hand, if desired the turn-off current produced by the negative pulses of wave form B may be of insufficient amplitude to turn device 42 off, but when that current is augmented by the capacitor discharge current a total reverse current will flow from the cathode to the gate of an amplitude which exceeds the minimum amplitude required to trigger the switch to its nonconductive state.

At the instant device 42 is completely off, the linearly increasing current flow from anode to cathode and through yoke 51 and primary 61 is abruptly terminated as shown by the anode-cathode current wave form in FIGURE 2. As is conventional in most horizontal sweep systems, when the switching device applying current to the yoke opens (which time defines the conclusion of each line-trace interval), the yoke and primary current ceases to increase and the magnetic fields which build up in the yoke and horizontal output transformer during the interval of rising current tend to collapse, resulting in the development of a relatively high amplitude retrace or flyback voltage pulse. As viewed at the upper terminals of yoke 51 and primary winding 51 with respect to their lower terminals, the retrace voltage pulses are of positive polarity as shown by wave form E. Since the upper terminals of yoke 51 and primary 61 are directly connected to the anode of switch 42, those high amplitude retrace pulses appear between the anode and cathode.

By comparing the gate-cathode current wave form with wave form E in FIGURE 2, it will be noted that capacitor 41 has effected such a fast turn-off of device 42 that the gate-cathode current ceases to flow before a retrace voltage pulse attains an appreciable amplitude. Overlapping between the reverse gate-cathode current and the positive retrace voltage pulses of wave form E occurs when both the current and voltage are of relatively small amplitudes. Thus, relatively little power is consumed in device 42 by the turn-off current and the retrace voltage pulses. This is in marked contrast with previously developed semiconductor sweep systems, in which the cut-off time is prolonged to such an extent that the turn-off current is still of substantial magnitude at the time a retrace voltage reaches its peak or close to peak amplitude, resulting in an appreciable power loss.

In conventional manner, the flyback pulses of wave form E are transformed from primary 61 to secondary 63 of transformer 62 at a voltage step-up ratio in order that higher potential pulses are applied across the series circuit including high voltage rectifier 66 and filter 70. The horizontal output transformer is so wound that the voltage pulses developed across secondary 63 are of positive polarity as viewed at the upper terminal of that secondary with respect to its lower terminal. In this way, the rectifier 66 rectifies these pulses and filter 70 effectively converts them into a high positive D.C. potential suitable for the second anode of a conventional picture tube.

At the end of each line-trace interval when the magnetic fields in yoke 51 and primary 61 tend to collapse, the energy stored therein also effects cosinusoidal current flow into condenser 57. This is shown by the current wave form for capacitor 57 in FIGURE 2 during the first half of each retrace interval embraced by the indicia $t_1$–$t_2$. During the second half of each retrace interval, namely in the period defined by indicia $t_2$–$t_3$, current flows out of the condenser and into yoke 51 and primary winding 61. At time $t_3$, the energy stored in the yoke and primary produce linearly decreasing current, enduring for approximately one-half of the trace interval, out of the yoke and primary and through damper diode 56, as shown by the recovery diode 56 current wave form in FIGURE 2.

As shown by the anode-cathode current wave form of device 42, current flows from the positive terminal of potential source 53 and through yoke 51 and primary 61 in one direction during the second-half of each trace interval, while the energy remaining at the end of retrace in the yoke and primary winding effect current flow through yoke 51 and primary 61 in the opposite direction during the first half of each trace interval, as evidenced by the diode 56 current wave form. The yoke current is also shown in FIGURE 2. During trace it is a combination of that flowing through switching device 42 and recovery diode 56. The yoke current during retrace is cosinusoidal as shown, being the same current which flows through condenser 57.

It has been shown that the switching arrangement of the present invention is capable of switching relatively high amplitude current flow through yoke 51, which is necessary to sweep present day picture tubes, by means of relatively little driving power. The amount of energy on the part of the pulses of wave form B to trigger device 42 off and on is substantially less, due to the contribution of capacitor 41, than that required on the part of driver stages for previously developed semiconductor switching arrangements, suitable for use in horizontal scanning generators. In addition, because of the relatively high magnitude of discharge current translated from capacitor 41 through junction 49, device 42 may be switched off very rapidly compared to previous switching arrangements, thereby minimizing the power consumed in the horizontal output stage.

The invention has therefore provided a new and improved television horizontal scanning generator in which a bistable semiconductor switching device is alternately and rapidly switched between stable conductive and nonconductive operating conditions to produce high amplitude current of sawtooth wave form in a substantially inductive horizontal deflection yoke. Actuation of the switching device to its nonconductive state is expedited by discharging energy which is developed and stored while the switch is in its conductive state.

While a particular embodiment of the invention has been shown and described, modifications may be made, and it is intended in the appended claims to cover all such modifications as may fall within the true spirit and scope of the invention.

I claim:

1. A horizontal scanning system for an image-reproducing device in a television receiver, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including a substantially inductive horizontal deflection yoke, coupled to said first and second terminals of said switching device;

a pulse signal source for developing periodically recurring pulses of alternating polarity;

means for utilizing the pulses of one polarity to translate turn-on current between said control and first terminals to effect substantially linearly increasing current flow through said load, and for utilizing the pulses of the other polarity to translate turn-off current between said control and first terminals;

and means including an energy storage device coupled to said pulse signal source to be charged in response to said pulses of said one polarity and coupled to said switching device to be discharged in response to said pulses of said other polarity for effecting additional reverse current flow between said control and first terminals to augment said turn-off current and expedite establishment of said switching device in said second operating condition.

2. A horizontal scanning system for an image-reproducing device in a television receiver, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including a substantially inductive horizontal deflection yoke, coupled to said first and second terminals of said switching device;

a transistorized driver for developing periodically recurring pulses of alternating polarity;

means including a differentiating circuit for utilizing the pulses of one polarity to translate turn-on current between said control and first terminals to effect substantially linearly increasing current flow through said load, and for utilizing the pulses of the other polarity to translate turn-off current between said control and first terminals;

and means including an energy storage device coupled to said transistorized driver to be charged in response to said pulses of said one polarity and coupled to said switching device to be discharged in response to said pulses of said other polarity for effecting additional reverse current flow between said control and first terminals to augment said turn-off current and expedite establishment of said switching device in said second operating condition.

3. A horizontal scanning system for developing, in a substantially inductive horizontal deflection yoke for an image-reproducing device in a television receiver, a saw-tooth current wave form periodically recurring at a predetermined horizontal scanning frequency, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including said horizontal deflection yoke, coupled to said first and second terminals of said switching device;

a signal source for developing signal components periodically recurring at said horizontal scanning frequency;

a transistorized driver, coupled to said source and controlled by said signal components, for developing periodically recurring pulses of alternating polarity;

means for utilizing the pulses of one polarity to translate turn-on current between said control and first terminals to effect substantially linearly increasing current flow through said load, and for utilizing the pulses of the other polarity to translate turn-off current between said control and first terminals;

and means including an energy storage device coupled to said transistorized driver to be charged in response to said pulses of said one polarity and coupled to said switching device to be discharged in response to said pulses of said other polarity for effecting additional reverse current flow between said control and first terminals to augment said turn-off current and expedite establishment of said switching device in said second operating condition.

4. A horizontal scanning system for an image-reproducing device in a television receiver, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including a substantially inductive horizontal deflection yoke, coupled to said first and second terminals of said switching device;

a pulse signal source for developing periodically recurring pulses of alternating polarity;

means including a differentiating circuit for coupling said pulse signal source to said switching device to translate turn-on current, in response to the pulses of one polarity, between said control and first terminals to effect substantially linearly increasing current flow through said load, and to translate turn-off current, in response to the pulses of the other polarity, between said control and first terminals;

and means including a capacitor, included in said coupling means, to be charged in response to said pulses of said one polarity and to be discharged in response to said pulses of said other polarity for effecting additional reverse current flow between said control and first terminals to augment said turn-off current and expedite establishment of said switching device in said second operating condition.

5. A horizontal scanning system for an image-reproducing device in a television receiver, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including a substantially inductive horizontal deflection yoke, coupled to said first and second terminals of said switching device;

a pulse signal source for developing a voltage pulse of one polarity during a given time interval and a voltage pulse of the opposite polarity during an immediate subsequent time interval;

means including a differentiating circuit for coupling said pulse signal source to said switching device to translate turn-on current, in response to the voltage pulse of said one polarity, between said control and said first terminals to effect substantially linearly increasing current flow through said load, and to translate turn-off current, in response to the voltage pulse of said opposite polarity, between said control and first terminals;

and means including a capacitor, included in said coupling means, to be charged during said given time interval in response to said turn-on current and to be discharged during said immediate subsequent time interval for effecting additional reverse current flow between said control and first terminals to augment said turn-off current and expedite establishment of said switching device in said second operating condition.

6. A horizontal scanning system for an image-reproducing device in a television receiver, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including a substantially inductive horizontal deflection yoke, coupled to said first and second terminals of said switching device;

a pulse signal source for developing periodically recurring pulses of alternating polarity;

a coupling circuit for coupling said pulse signal source to said control and first terminals to translate turn-on current, in response to the pulses of one polarity, between said control and first terminals to effect substantially linearly increasing current flow through said load, and to translate turn-off current, in response to the pulses of the other polarity, between said control and first terminals;

and a capacitor coupled in series with said coupling circuit to be charged in response to said turn-on current and to be discharged in response to said pulses of said other polarity for effecting additional reverse current flow between said control and first terminals to augment said turn-off current and expedite establishment of said switching device in said second operating condition.

7. A horizontal scanning system for an image-reproducing device in a television receiver, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to reverse current flow between said control and first terminals of a predetermined minimum amplitude to establish said device in a second stable operating condition in which substantially no current is translated between said first and second terminals;

an output load, including a substantially inductive horizontal deflection yoke, coupled to said first and second terminals of said switching device;

a pulse signal source for developing periodically recurring pulses of alternating polarity;

means for utilizing the pulses of one polarity to translate turn-on current between said control and first terminals to effect substantially linearly increasing current flow through said load, and for utilizing the pulses of the other polarity to translate turn-off current, of an amplitude less than said predetermined minimum amplitude, between said control and first terminals;

and means including an energy storage device coupled to said pulse signal source to be charged in response to said pulses of said one polarity and coupled to said switching device to be discharged in response to said pulses of said other polarity for effecting additional reverse current flow between said control and first terminals to augment said turn-off current to the extent that the total reverse current flow exceeds said predetermined minimum amplitude.

8. A horizontal scanning system for an image-reproducing device in a television receiver, comprising:

a bistable semiconductor switching device having first, second and control terminals and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including a substantially inductive horizontal deflection yoke, coupled to said first and second terminals of said switching device;

a pulse signal source for developing a pulse of one polarity during a given first time interval and a pulse of the opposite polarity during a subsequent second time interval;

means for utilizing the pulse of said one polarity to translate turn-on current between said control and first terminals to effect substantially linearly increasing current flow through said load, and for utilizing the pulse of said opposite polarity to translate turn-off current between said control and first terminals;

and means including a capacitor coupled to said pulse signal source to be charged in response to said pulse of said one polarity and coupled to said switching device to be discharged in response to said pulse of said opposite polarity, during a discharge time interval of a duration considerably less than the duration of said second time interval, for effecting additional reverse current flow between said control and first terminals to augment said turn-off current and expedite establishment of said switching device in said second operating condition, said capacitor, subsequent to its discharge and during the remainder of said second time interval, presenting an impedance to impede the flow of reverse current between said control and first terminals.

9. A horizontal scanning system for an image-reproducing device in a television reciever, comprising:

a bistable semiconductor switching device having cathode, anode and gate terminals and responsive to the translation of turn-on current from said gate to said cathode terminals to establish said device in a first stable operating condition in which current is translated from said anode to said cathode terminals, and responsive to a predetermined reverse current flow from said cathode to said gate terminals to establish said device in a second stable operating condition in which substantially no current is translated between said cathode and anode terminals;

an output load, including a substantially inductive horizontal deflection yoke, coupled to said cathode and anode terminals of said switching device;

a pulse signal source for developing periodically recurring pulses of alternating polarity;

means including a differentiating circuit for utilizing the pulses of one polarity to translate turn-on current from said gate to said cathode terminals to effect substantially linearly increasing current flow through said load, and for utilizing the pulses of the other polarity to translate turn-off current from said cathode to said gate terminals;

and means including a capacitor coupled to said pulse signal source to be charged in response to said pulses of said one polarity and coupled to said switching device to be discharged in response to said pulses of said other polarity for effecting additional current flow from said cathode to said gate terminals to augment said turn-off current and expedite establishment of said switching device in said second operating condition.

10. A horizontal scanning system for an image-reproducing device in a television receiver, comprising:

a bistable semiconductor switching device including four layers of alternate conductivity type semiconductor material forming three different PN junctions;

a series circuit including a substantially inductive horizontal deflection yoke and all three of said junctions of said switching device;

a pulse signal source for developing periodically recurring pulses of alternating polarity;

means for utilizing the pulses of one polarity to translate turn-on current in a predetermined direction through a predetermined one of said junctions to forward bias said one junction and effect substantially linearly increasing current flow through said series circuit, and for utilizing the pulses of the other polarity to translate turn-off current through said one junction in the reverse direction tending to reverse bias said one junction and effect termination of current flow through said series circuit;

and means including a capacitor coupled to said pulse signal source to be charged in response to said pulses of said one polarity and coupled to said switching device to be discharged in response to said pulses of said other polarity for effecting additional reverse current flow through said one junction to augment said turn-off current and expedite the termination of current flow through said series circuit.

11. A horizontal scanning system for an image-reproducing device in a television receiver, comprising:

a bistable semiconductor switching device, including four layers of alternate conductivity type semiconductor material forming three different PN junctions, having first and second terminals respectively connected to the two outer layers and a control terminal connected to one of the two intermediate layers and responsive to the translation of turn-on current in a predetermined direction between said control and first terminals to establish said device in a first stable operating condition in which current is translated between said first and second terminals, and responsive to a predetermined reverse current flow between said control and first terminals to establish said device in a second stable operating condition in which substantially no current is translated between said first and second terminals;

an output load, including a substantially inductive horizontal deflection yoke, coupled to said first and second terminals of said switching device;

a pulse signal source for developing periodically recurring pulses of alternating polarity;

means for utilizing the pulses of one polarity to translate turn-on current between said control and first terminals to effect substantially linearly increasing current flow through said load, and for utilizing the pulses of the other polarity to translate turn-off current between said control and first terminals;

and means including a capacitor coupled to said pulse signal source to be charged in response to said pulses of said one polarity and coupled to said switching device to be discharged in response to said pulses of said other polarity for effecting additional reverse current flow between said control and first terminals to augment said turn-off current and expedite establishment of said switching device in said second operating condition.

12. A horizontal scanning system for an image-reproducing device in a television receiver, comprising:

a bistable semiconductor switching device having first, second and control terminals and having a PN junction between said control and first terminals and responsive to the application of voltage of one polarity between said control and first terminals to establish said device in a first stable operating condition in which current is translated between said first and second terminals, and responsive to the application of voltage of opposite polarity between said control and first terminals to establish said device in a second stable operating condition in which substantially no current is translated between said first and second terminals, said junction being subject to a predetermined Zener breakdown voltage;

an output load, including a substantially inductive horizontal deflection yoke, coupled to said first and second terminals of said switching device;

a pulse signal source for developing periodically recurring voltage pulses of alternating polarity;

means coupled to said source for applying voltage pulses of said one polarity between said control and first terminals to establish said switching device in said first operating condition and effect substantially linearly increasing current flow through said load, and for applying voltage pulses of said opposite polarity between said control and first terminals tending to establish said switching device in said second operating condition;

and means including a capacitor coupled to said pulse signal source to be charged during the application of said pulses of said one polarity to develop a potential which is effectively added to said voltage pulses of said opposite polarity to the extent that the Zener breakdown voltage of said junction is exceeded and the establishment of said switching device in said second operating condition is expedited.

References Cited by the Examiner

UNITED STATES PATENTS

| | | | |
|---|---|---|---|
| 2,996,641 | 8/1961 | Paynter | 315—27 |
| 3,210,601 | 10/1965 | Walker | 315—27 |

DAVID G. REDINBAUGH, *Primary Examiner.*

T. A. GALLAGHER, *Assistant Examiner.*